US011193866B2

(12) United States Patent
 Algarni

(10) Patent No.: US 11,193,866 B2
(45) Date of Patent: Dec. 7, 2021

(54) CYLINDRICAL HEATING APPARATUS

(71) Applicant: King Abdulaziz University, Jeddah (SA)

(72) Inventor: Mohammed Algarni, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 17/352,428

(22) Filed: Jun. 21, 2021

(65) Prior Publication Data
US 2021/0310918 A1   Oct. 7, 2021

Related U.S. Application Data

(63) Continuation of application No. 16/360,648, filed on Mar. 21, 2019.

(51) Int. Cl.
 *G01N 3/18* (2006.01)
 *H05B 3/28* (2006.01)
 (Continued)

(52) U.S. Cl.
 CPC .......... *G01N 3/18* (2013.01); *F27D 21/0014* (2013.01); *G01N 25/005* (2013.01);
 (Continued)

(58) Field of Classification Search
 None
 See application file for complete search history.

(56) References Cited

U.S. PATENT DOCUMENTS 2,375,032 A * 5/1945 Parke ................. G01N 3/18
                                                              374/50
2,660,881 A * 12/1953 Van Degrift ........... G01N 3/18
                                                              374/47
(Continued)

FOREIGN PATENT DOCUMENTS

AR           107908 A1     6/2018
CN       102944466 B  *   9/2014
(Continued)

OTHER PUBLICATIONS

CN206311422U, Xu et al, Bibliographical data, Jul. 2017 (Year: 2017).*

(Continued)

*Primary Examiner* — Joseph M. Pelham
(74) *Attorney, Agent, or Firm* — Oblon, McClelland, Maier & Neustadt, L.L.P.

(57) ABSTRACT

A specimen heating apparatus includes a heater unit configured to heat a test specimen held in a material testing machine, a heater holding unit configured to hold the heater unit in a set position relative to the test specimen for heating, a specimen temperature measurement unit attached to the heater unit and configured to measure temperature of the test specimen when the heater unit is in the set position, a temperature controller configured to control heating of the heater unit in response to a temperature measured by the specimen temperature measurement unit, and a thermal insulation unit configured to cover the heater unit, wherein the heater holding unit holds the heater unit in such a way that the heater unit is allowed to be brought to and removed from the set position while the test specimen is being held in the material testing machine.

10 Claims, 11 Drawing Sheets

(51) Int. Cl.
F27B 17/02 (2006.01)
F27D 5/00 (2006.01)
F27D 99/00 (2010.01)
G01N 25/00 (2006.01)
H05B 1/02 (2006.01)
H05B 3/00 (2006.01)
F27D 21/00 (2006.01)
F27B 13/08 (2006.01)
F27B 13/12 (2006.01)
F27B 13/00 (2006.01)

(52) U.S. Cl.
CPC ......... *H05B 1/0202* (2013.01); *H05B 1/0227* (2013.01); *H05B 3/0019* (2013.01); *H05B 3/283* (2013.01); *F27B 13/00* (2013.01); *F27B 13/08* (2013.01); *F27B 13/12* (2013.01); *F27D 5/005* (2013.01); *G01N 2203/0202* (2013.01); *G01N 2203/0226* (2013.01); *G01N 2203/0228* (2013.01); *H05B 2203/035* (2013.01)

(56) References Cited

U.S. PATENT DOCUMENTS

| | | | | |
|---|---|---|---|---|
| 3,015,947 A * | 1/1962 | Kadel | ................... | G01N 33/26 374/52 |
| 3,599,476 A * | 8/1971 | Corbett | .................. | G01N 25/00 374/50 |
| 4,367,961 A * | 1/1983 | Griffin | ..................... | G01N 3/00 374/46 |
| 5,220,824 A * | 6/1993 | Shelleman | ............... | G01N 3/12 374/57 |
| 2021/0140862 A1* | 5/2021 | Suh | .......................... | G01N 3/18 |

FOREIGN PATENT DOCUMENTS

| | | | |
|---|---|---|---|
| CN | 104215521 A | * | 12/2014 |
| CN | 206311422 U | * | 7/2017 |
| CN | 105646001 B | | 8/2018 |
| JP | 2009-115795 A | | 5/2009 |

OTHER PUBLICATIONS

CN104215521A, Qian et al, Bibliographical data, Dec. 2014 (Year: 2014).*

CN102944466B, Wang et al, Bibliographical data, Sep. 2014 (Year: 2014).*

MP Machinery and Testing, LLC. ; In-situ Heating & Cooling ; http://www.mpmachineryandtesting.com/institu-heating-cooling/ ; Product ; Oct. 18, 2018 ; 3 Pages.

* cited by examiner

CYLINDRICAL HEATING APPARATUS

CROSS-REFERENCE TO RELATED APPLICATIONS

The present application is a Continuation of U.S. application Ser. No. 16/360,648, having a filing date of Mar. 21, 2019.

BACKGROUND

Technical Field

The present disclosure is directed to a heating apparatus for heating a test specimen held in a material testing machine. Specifically, the present disclosure is directed to an in-situ heating apparatus that can be used in various universal testing machines.

Description of Related Art

The "background" description provided herein is for the purpose of generally presenting the context of the disclosure. Work of the presently named inventor, to the extent it is described in this background section, as well as aspects of the description which may not otherwise qualify as prior art at the time of filing, are neither expressly or impliedly admitted as prior art against the present invention.

A universal testing machine (UTM), or tensometer, is used to apply various types of mechanical tests that help to understand how materials behave under different types of load. These different types of loads are tension, compression, cyclic, torsion, shear, and bending. Each test applied by the UTM provides different aspects of the mechanical properties of a material. Different mechanical tests can be fracture, fatigue, creep, wearing, etc. These mechanical tests provide the material's characteristic features before failure. The material's characteristic features define the material's thresholds prior to failure. These characteristics are necessary for designers and engineers to ensure safe usage of the materials.

Many previous studies have determined the mechanical characteristics of many materials and they are all set in well-known handbook references (i.e., ASM Handbook, "Volume 1," Properties and Selection: Irons, Steels, and High Performance Alloys, vol. 1, 2005, B. John, B. John, and B. Peter, ASM handbook Volume 8: mechanical testing and evaluation. Asm International, 2017). However, the ongoing development of new materials requires conducting extensive mechanical tests and defining their mechanical characteristics to update the handbook references.

In real-world operating conditions, engineering parts and structures may face different environments, such as high temperatures, cryogenic, onshore, humidity, corrosive, and high pressure. In each environment, engineers and designers require special attention to study the performance of the materials and reconsider the environmental effects on metal or composite material life. An example of engineering parts in high-temperature environments is gas turbine blades (made of Inconel 718 super alloy), operating in temperatures over 1,000° C. (B. Erice and F. Gálvez, "A coupled elasto-plastic-damage constitutive model with Lode angle dependent failure criterion," International Journal of Solids and Structures, vol. 51, no. 1, pp. 93-110, Jan. 1, 2014, B. Erice, M. J. Pérez-Martin, and F. Gálvez, "An experimental and numerical study of ductile failure under quasi-static and impact loadings of Inconel 718 nickel-base superalloy," International Journal of Impact Engineering, vol. 69, no. 0, pp. 11-24, July 2014.). This present disclosure relates to the influence of high temperatures on material behavior and life and includes a description of a new apparatus and method to test materials under such high temperatures.

Many extensive ongoing studies and published research have investigated materials' different behavior under a variety of high temperatures. Yuan R. et al. (R. Yuan, J. J. Kruzic, X. F. Zhang, L. C. De Jonghe, and R. O. Ritchie, "Ambient to high-temperature fracture toughness and cyclic fatigue behavior in Al-containing silicon carbide ceramics," Acta Materialia, vol. 51, no. 20, pp. 6477-6491, 2003) examined silicon carbide ceramics (ABC-SiC) with different percentages of Al content under a very high temperature (1,300° C.). It was found that the fatigue limit for all materials was less when compared to the fatigue limit at 25° C. In another recent study, Al-Alkawi et al. (H. J. M. Al-Alkawi, M. H. Ali, and S. G. Mezban, "Elevated temperature fatigue SN curve behavior for three different carbon percentage steel alloys," International Journal of Energy and Environment, vol. 8, no. 4, pp. 307-315, 2017) tested three different carbon-based steel alloys (they differed in carbon content percentage) to compare and investigate the effect of carbon content on fatigue life in a moderate high-temperature environment (100° C.). The fatigue results were compared to room temperature fatigue life to illustrate the effects of high temperature on the three materials. The research team found that both fatigue life and strength decrease dramatically when increasing the temperature. In addition, the fatigue strength of the material with a lower content of carbon showed a high resistance to cyclic loading and a negligible reduction in fatigue strength. The high-temperature effects on the three materials weakens the fatigue strength and life.

Nogami et al. (S. Nogami, A. Nishimura, E. Wakai, H. Tanigawa, T. Itoh, and A. Hasegawa, "Development of fatigue life evaluation method using small specimen," Journal of Nuclear Materials, vol. 441, no. 1-3, pp. 125-132, 2013) presented a new method to evaluate low-cycle fatigue life of small specimens, including the effect of specimen size. The applied high temperature was 550° C. The results of the high temperature effect show a reduction in the fatigue life by 40-90% when compared to room temperature fatigue life. Also, the final fracture stage occurred faster under high temperatures. Luis et al. (L. Straßberger, A. Chauhan, T. Gräning, S. Czink, and J. Aktaa, "High-temperature low-cycle fatigue behavior of novel austenitic ODS steels," International Journal of Fatigue, vol. 93, pp. 194-200, 2016) investigated a new steel (17Cr13Ni—W) fatigue life under high temperature (650° C.). They revealed a minor change in the fatigue life under high temperature due to the high content of Cr and Ni.

Another study investigated the effect of high temperature on the Aluminum alloy 7055 microstructure, fracture for both longitudinal and transverse orientations, and anisotropic behavior in the high-cycle fatigue regime at ambient (27° C.) and high temperatures (190° C.) (T. S. Srivatsan, S. Anand, S. Sriram, and V. K. Vasudevan, "The high-cycle fatigue and fracture behavior of aluminum alloy 7055," Materials Science and Engineering: A, vol. 281, no. 1-2, pp. 292-304, 2000.). The results showed a significant reduction (35%) in yield strength and an ultimate tensile strength decrease for both longitudinal and transverse orientations in fracture experiments. Likewise, at high temperatures and high cyclic stress amplitudes, the fatigue life of the transverse is shorter when compared with the longitudinal orientations. In the same vein, Choe et al. (H. Choe, D. Chen, J. H. Schneibel, and R. O. Ritchie, "Ambient to high temperature fracture toughness and fatigue-crack propagation behavior in a Mo-12Si-8.5 B (at. %) intermetallic," Intermetallics, vol. 9, no. 4, pp. 319-329, 2001) compared the fatigue-crack propagation behavior of 1Mo-12Si-8.5B alloy under room and high temperatures. They clearly showed a relatively high crack-initiation and increasing fracture toughness at 800° C. In addition, they discovered that the stress intensity verge for fatigue due to cycling loading under high temperature increased.

Recent research has investigated the influence of a high-temperature environment on material behavior and service life. In all the research, a variety of heat sources and methods were used to heat material specimens during or prior to experiments based on the research needs and their facility's capability.

Currently, for high-temperature experiments, the heating systems used in UTMs are in-situ furnaces, such as the MTS Model 653 family of furnaces. This heating system is well known in the market for being reliable and efficient, yet very expensive to purchase. Acquiring such furnaces requires a great deal of budgeting, special care, and training. Although this furnace serves the purpose, relatively few laboratories, research centers, and universities around the world (particularly in developing countries), can afford to acquire this sophisticated furnace. In addition, shipping from the manufacturer (i.e. in the US or Europe) is a major obstacle for developing countries and rural universities.

Environmental chambers are another heating system used in many specialized types of research. They provide a good simulation of real-world operating conditions, such as temperature, humidity, and caustic conditions. However, this apparatus is very complicated, heavy, expensive, and requires special training and spacing. Moreover, it does not provide access to the sample during the test for strain measurements. This heating system is highly delicate, sophisticated, and requires special operational training.

Another existing option for heating specimens is the induction heating system. This system is based on the laws of electromagnetism. The inductor coil part, made of copper, very closely surrounds a metal specimen with no direct contact. A high-frequency AC current runs through the coil. The metal specimen is then heated by the induced current flow in the metal specimen. This method offers an excellent combination of speed and consistency. However, the heat generated in the metal specimen due to the induced current flow is not radially uniform. The temperature is high at the specimen's surface and at a minimum in the specimen's core. Also, the induction heating is not applicable for non-metallic and non-magnetic materials. Moreover, it is challenging to use during testing and strain measuring.

Joule heating is another heating method used mostly for miniature and nano-specimens. It is done by introducing a DC voltage to the specimen's two ends that lead to a current flow. The high-density current flow will make the specimen heat-up in its minimal area. This method requires special attention and calculation in the design of the specimen to ensure that the heating area is located in the intended zone of the specimen. Also, this heating system requires sophisticated experimental tools and setup. Moreover, it necessitates basic knowledge in the electric field to calculate the required experimental temperature. This method is only applicable for metals that allow the flow of electric current unlike composite materials.

These are the primarily known and used heating methods used in UTM testing experiments and research. Each one has its own pros and cons during the experimental setup and tests. However, a common disadvantage of the heating methods mentioned above is that they all require a considerable budget to obtain. Research funding is a significant obstacle for many research centers and universities, particularly for developing countries. This issue prevents them from contributing to the international research community who share the same interests. Moreover, the cost of the annex services, such as training, installation, continuous maintenance, and shipping can be prohibitive. It is desirable to provide a new heating apparatus and method that overcome the foregoing cons and yet maintain the foregoing pros of the existing heating systems so that researchers and graduate students can easily contribute while preserving the best quality experimental set up at less cost. Such a heating apparatus and method may service a vast community of mechanical engineers, civil engineers, and researchers who have an interest in discovering both macro- and micro-mechanical properties of metals and composite materials under high temperatures. It also provides many advantages and benefits over other existing heating methods.

SUMMARY OF THE INVENTION

In an exemplary embodiment, a specimen heating apparatus for a material testing machine includes a heater unit configured to heat a test specimen held in the material testing machine for mechanical strength testing, a heater holding unit configured to hold the heater unit in a set position relative to the test specimen for heating the test specimen held in the material testing machine, a specimen temperature measurement unit attached to the heater unit and configured to measure temperature of the test specimen when the heater unit is in the set position, a temperature controller configured to control heating of the heater unit in response to a temperature measured by the specimen temperature measurement unit, and a thermal insulation unit configured to cover the heater unit, wherein the heater holding unit holds the heater unit in such a way that the heater unit is allowed to be brought to and removed from the set position while the test specimen is being held in the material testing machine.

The foregoing general description of the illustrative embodiment and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
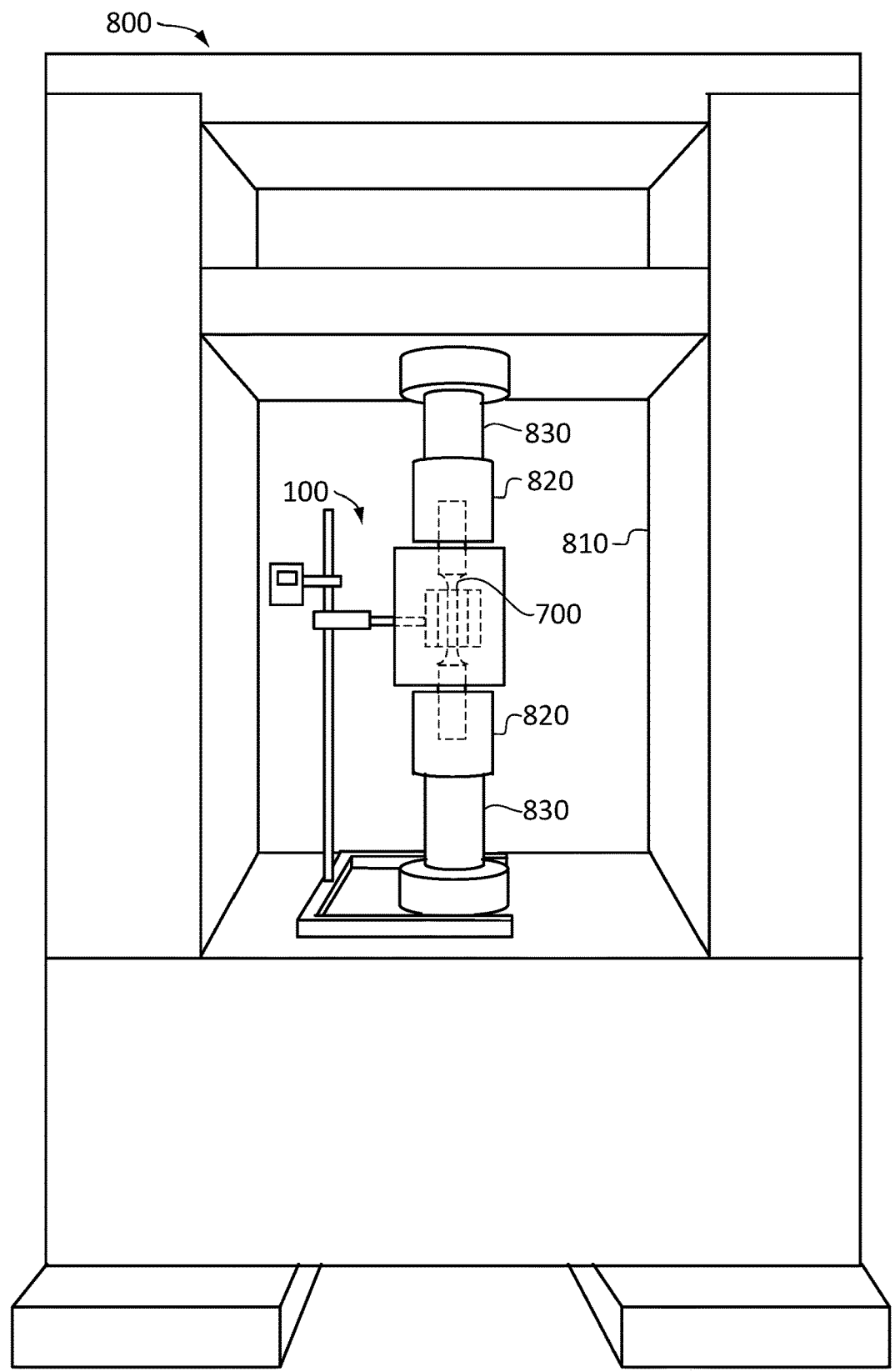
FIG. 1 is a schematic diagram illustrating an exemplary system set-up in which a specimen heating apparatus is placed in a set position for heating a test specimen held in a material testing machine, according to certain embodiments.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts. For purposes of the description hereinafter, the terms "upper", "lower", "right", "left", "vertical", "horizontal", "top", "bottom", and derivatives thereof shall relate to the disclosed structures and methods, as oriented in the drawing figures. Furthermore, the terms "approximately," "approximate," "about," and similar terms generally refer to ranges that include the identified value within a margin of 20%, 10%, or preferably 5%, and any values therebetween.

Embodiments of the present disclosure are now described in detail with reference to the drawings.

First Embodiment

A specimen heating apparatus according to the first embodiment is described with reference to FIG. 1 to FIG. 7. FIG. 1 is a schematic diagram illustrating an exemplary system set-up in which a specimen heating apparatus 100 is placed in a set position for heating a test specimen 700 held in a material testing machine 800, according to certain embodiments. The material testing machine 800 illustrated in FIG. 1 is also referred to as a universal testing machine (UTM) that can perform various mechanical tests such as tensile, compression, flexural, fracture, fatigue, torsion, and shear tests on materials and components.

In this example, it is assumed that the material testing machine 800 is performing a tensile test on the test specimen 700. A load-elongation curve obtained from this tensile test gives a variety of information such as a stress-strain curve, which serves as basis of design work, and enables to obtain tensile mechanical properties of the material being tested. The material testing machine 800 may alternatively be a single-function testing machine that can perform tensile testing on the test specimen 700.

As illustrated in FIG. 1, the material testing machine 800 includes a main frame 810, a pair of specimen grips 820, and connecting rods 830 that connect the main frame 810 and the specimen grips 820. The test specimen 700 is being held between the specimen grips 820 during tensile testing. The test specimen 700 is, for example, a round bar made of a material to be tested and has two shoulders and a gauge section in between. The shoulders are larger and gripped by the specimen grip 820. The gauge section has a smaller cross-section. The test specimen 700 may also be prepared in a square cross section along the gauge section. Alternatively, the test specimen 700 may have threaded shoulders. In this case, the specimen grip 820 is provided with a threaded grip that mates with the threaded shoulder of the test specimen 700. In the case where the test specimen 700 has threaded shoulders, the length of each shoulder for gripping may be made shorter, thereby making it possible to reduce the overall length of the test specimen 700.

In the case where the test specimen 700 is made of carbon steel, plastic deformation occurs when it is heated to 200-500° C. This phenomenon is called blue brittleness. To check characteristics of the test specimen 700 in such a high temperature environment, it is necessary to perform a tensile test on the test specimen 700 while heating the test specimen 700. With the specimen heating apparatus 100, it is possible to perform a tensile test on the test specimen 700 placed in the material testing machine 800 at an elevated temperature.

Figure 2:
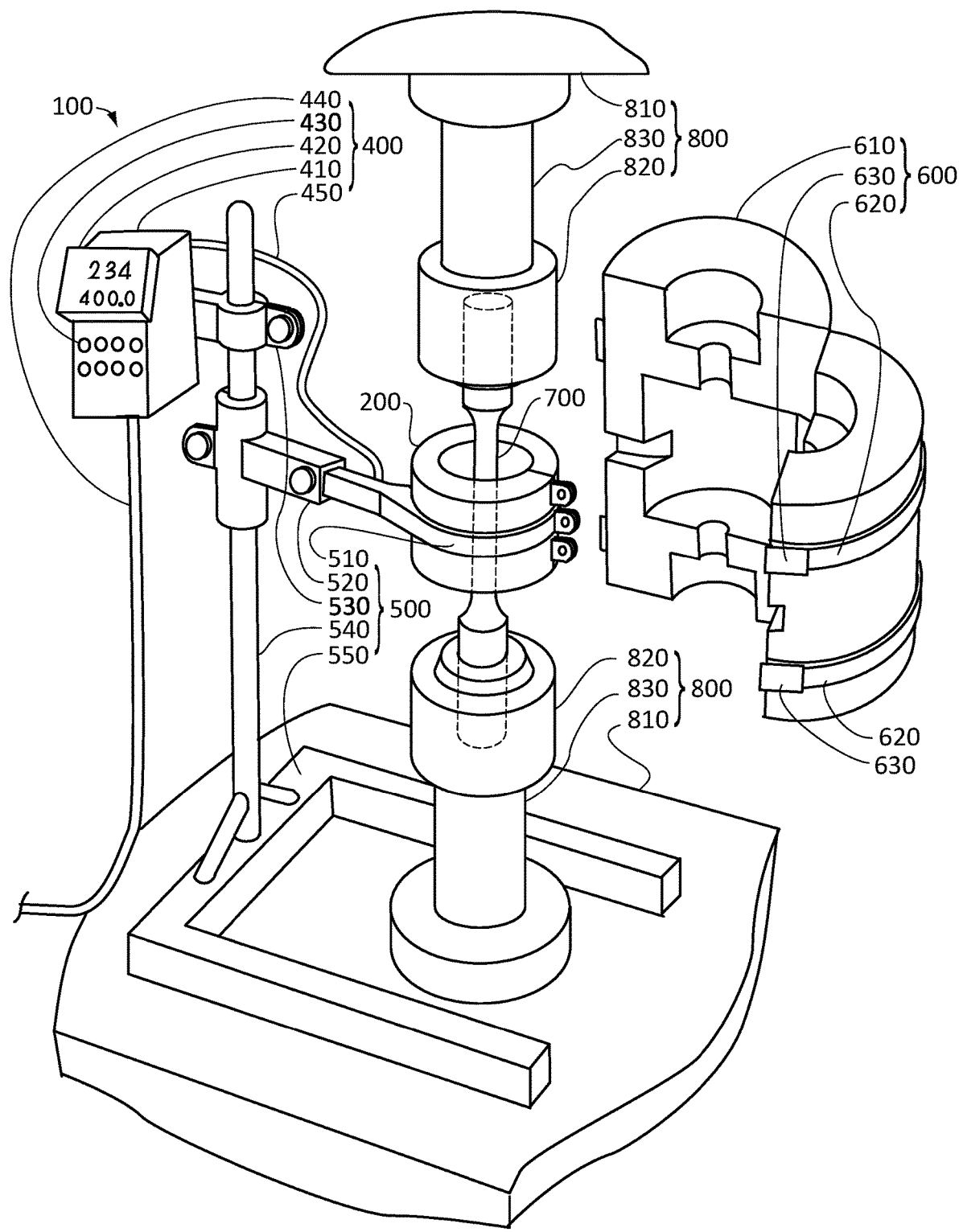
FIG. 2 is a schematic perspective view of the specimen heating apparatus according to a first embodiment.

FIG. 2 is a schematic perspective view of the specimen heating apparatus 100 according to the first embodiment placed for heating the test specimen 700 held in the material testing machine 800. The specimen heating apparatus 100 includes a heater unit 200, a specimen temperature measurement unit 300, a temperature controller 400, a heater holding unit 500, and a thermal insulation unit 600. The specimen temperature measurement unit 300 is not illustrated in FIG. 2 and will be described in detail below. Further, the thermal insulation unit 600 illustrated in FIG. 2 is in the state before being attached to the heater unit 200.

The heater holding unit 500 is a structure designed in a way that holds the heater unit 200 and maintains stability and stiffness to withstand the weight of the heater unit 200 at high temperature environment. The heater holding unit 500 is, for example, made of any metal that can carry the heater unit 200. In the present embodiment, the heater holding unit 500 includes a heater holding ring 510, a heater holding arm 520, a temperature controller holding arm 530, a vertical stand 540, and a support base 550. The heater holding ring 510 has a ring-like shape for securely holding the heater unit 200. The heater holder ring 510 is, for example, made of a metal having a higher melting point than the maximum temperature of the heater unit 200.

The heater holding arm 520 is extendable in an approximately horizontal direction and connected to the heater holding ring 510 at one end. The other end of the heater holding arm 520 is supported by the vertical stand 540 in such a way that the position of the heater holding arm 520 can be moved in an approximately vertical direction. The temperature controller holding arm 530 holds the temperature controller 400. Alternatively, the temperature controller 400 may be held by the heater holding arm 520 or may be placed in the material testing machine 800, without using the temperature controller holding arm 530.

The vertical stand 540 is, for example, a round bar extending in a vertical direction and supports the heater holding arm 520 and the temperature controller holding arm 530 in such a way that the heights of the heater holding arm 520 and the temperature controller holding arm 530 can be changed. This facilitates vertical adjustment of the heater unit 200 to a desired part of the test specimen 700. The support base 550 includes a leg portion having an approximately letter "U" shape, on which the vertical stand 540 is fixed.

By adjusting the horizontal location of the support base 550, the heater holding unit 500 can be easily moved to a set position for heating the test specimen 700 held in the material testing machine 800. In other words, the heater unit 200 can be brought to the set position relative to the test specimen 700 held in the material testing machine 800 by adjusting the horizontal location of the support base 550 and adjusting vertical and horizontal positions of the heater holding arm 520. In the following description, the "set position" refers to a position of the heater unit 200 set for heating the test specimen 700 held in the material testing machine 800 and in which the test specimen 700 is approximately aligned with the axis of the heater unit 200.

The temperature controller 400 includes a controller main unit 410, a display 420, operation buttons 430, a power cable 440, and a connection cable 450. The display 420 displays a set temperature (target temperature), a measured temperature of the test specimen 700, and the like. The operation buttons 430 receive an operator's input and set a target temperature and the like. Electric power is supplied through the power cable 440. The connection cable 450 is used to supply electric power to the heater unit 200 for heating the test specimen 700 and to send an output signal from the thermocouple sensor 310 to the temperature controller 400. The temperature controller 400 will be described in detail below.

The thermal insulation unit 600 includes a pair of heat insulators 610, belts 620, and locks 630. The heat insulators 610 are, for example, made of a high-temperature thermal insulation material such as zirconia fiber or alumina fiber or the like. The heat insulators 610 are, for example, two semi-cylindrical members that are linked together at one end in such a way that the thermal insulation unit 600 can open and close. Each heat insulator 610 has recessed portions in such a way that when the heat insulators 610 are put together, spaces are formed inside the thermal insulation unit 600 for accommodating the heater unit 200, the test specimen 700, and the like.

The belts 620 are arranged at upper and lower sides of circumferences of the heat insulators 610 and are configured in such a way that two ends of each belt 620 are connected together with the lock 630. When the thermal insulation unit 600 is closed, the heater unit 200 and the test specimen 700 are covered by the heat insulators 610. This enables to prevent or reduce humidity and airflow from entering between the test specimen 700 and the heater unit 200, reducing heat loss and energy consumption during the heating.

Alternatively, the locks 630 may be communicably connected to the temperature controller 400 with a wired or wireless connection to allow the temperature controller 400 to control locking and unlocking of the locks 630. For example, the temperature controller 400 may controls the locks 630 in such a way that the locks 630 locks a closed state of the thermal insulation unit 600 when the temperature of the test specimen 700 exceeds a predetermined temperature and unlocks the closed state when the temperature of the test specimen 700 falls below the predetermined temperature at the end of a test. Here, the predetermined temperature is a safe temperature for handling the test specimen 700. Such locking control prevents an operator from opening the thermal insulation unit 600 when the temperature of the test specimen 700 is still high, preventing from getting burn by touching the test specimen 700 by mistake.

The heat insulators 610 are not limited to two semi-cylindrical members that are linked together at one end, and may be any other structure that opens and closes for uncovering and covering the heater unit 200 after the heater unit 200 is placed in the material testing machine 800 for heating the test specimen 700.

Figure 3:
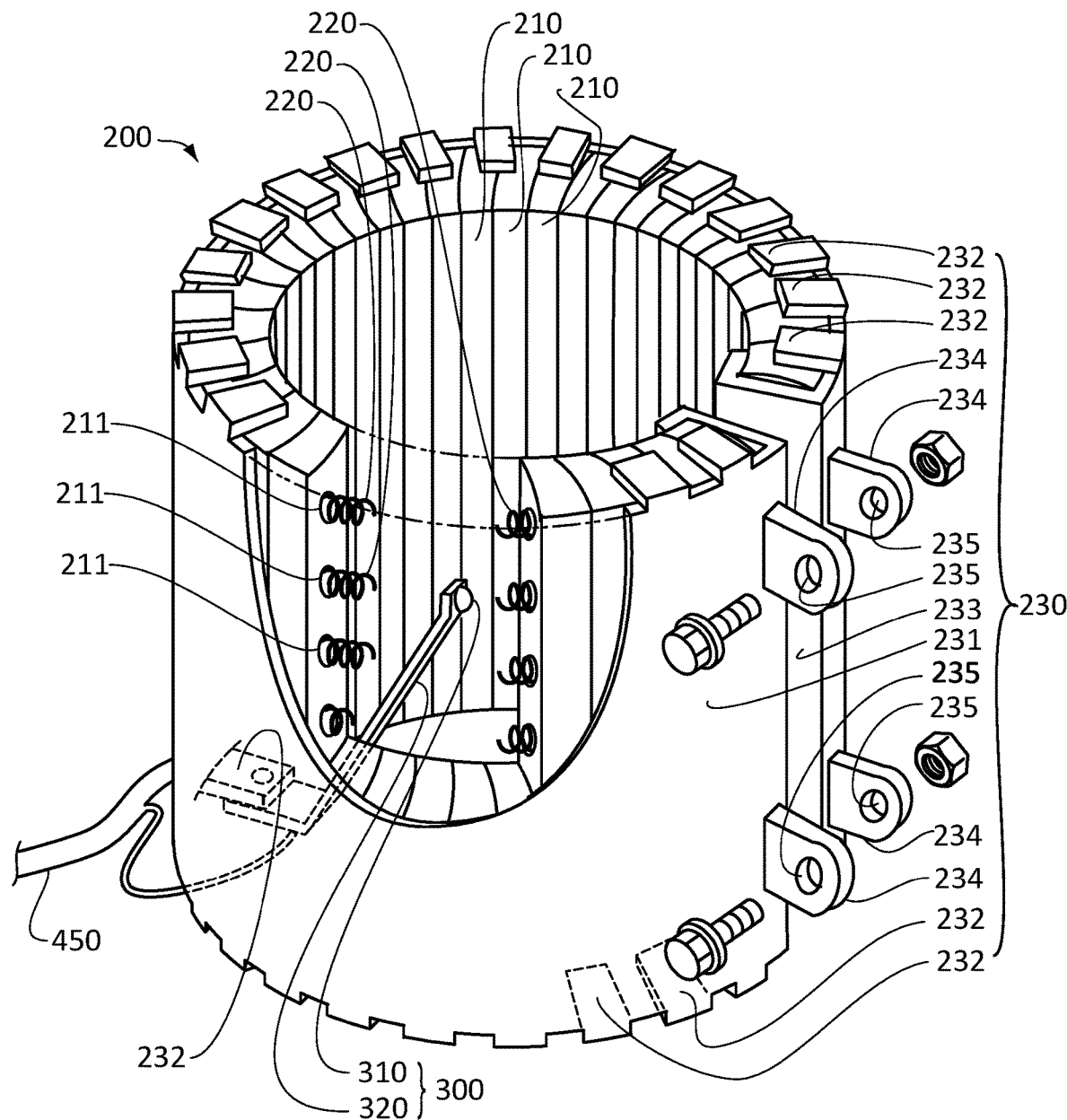
FIG. 3 is a partial-sectional view of a heater unit of the specimen heating apparatus according to the first embodiment.

FIG. 3 is a partial-sectional view of the heater unit 200 of the specimen heating apparatus 100 according to the first embodiment. The heater unit 200 includes a plurality of ceramic insulators 210, a plurality of heating elements 220, a metallic housing 230, and a heater power terminal (not illustrated). The ceramic insulator 210 has a stick-like shape extending lengthways and an arc-like cross section. The plurality of ceramic insulators 210 are put together side by side to form an approximately letter "C" shape whose opening is positioned on the right-hand side when viewed from the above.

In each ceramic insulator 210, a plurality of heating element holes 211 is formed so as to penetrate through the ceramic insulator 210. The heating element 220 is inserted continuously through the heating element holes 211 of the plurality of ceramic insulators 210 that are put together to form an approximately letter "C" shape, thereby forming a cylindrical heat generating unit. Here, the plurality of ceramic insulators 210 are linked together with the heating elements 220 penetrating therethrough in such a way that the plurality of ceramic insulators 210 is collectively swingable and forms an opening that is allowed to open and close for receiving the test specimen 700 while the test specimen 700 is being held by the specimen grips 820. The heating element 220 has a helix wound resistance coil and is, for example, made of a nickel-chromium alloy or the like. Alternatively, the heating element 220 may have an elongated sheet-like shape. The maximum temperature of the heater unit 200 is, for example, 500-700° C.

The metallic housing 230 is made of a metal plate such as a stainless steel plate and the like, and includes a cylindrical cover portion 231, a plurality of end cover portions 232, opening cover portions 233, and fastening portions 234. The cylindrical cover portion 231 covers an approximately cylindrical outer surface formed by the combined ceramic insulators 210. The end cover portions 232 each have an approximately inverse letter "U" shape. The end cover portions 232 protrude from the upper end and the lower end of the cylindrical cover portion 231 and are bended toward the axial center of the heater unit 200, thereby covering both upper and lower end surfaces of the ceramic insulators 210 and preventing the ceramic insulators 210 from moving up or down. A thermal insulation layer may be added between the cylindrical cover portion 231 and the ceramic insulators 210. The additional thermal insulation layer enables to reduce heat loss and facilitate heat concentration in the axial center region.

The opening cover portion 233 covers part of the outer surface, the side surface, and part of the inner surface of the ceramic insulator 210 that faces the opening. The fastening portion 234 is a protrusion with a fastening hole 235 and formed close to the opening so as to protrude outward. To close the opening, a bolt is inserted through the fastening holes 235 of the corresponding fastening portions 234 and tightened by torquing a nut.

The specimen temperature measurement unit 300 is built into the heater unit 200. The specimen temperature measurement unit 300 includes a thermocouple sensor 310 and a sensor arm 320. The sensor arm 320 is formed of an elongated metal plate having elasticity, such as stainless steel plate or the like. The thermocouple sensor 310 is attached to one end of the sensor arm 320, and the other end of the sensor arm 320 is mechanically secured on one of the end cover portions 232 formed on the lower end of the heater unit 200 by riveting. Further, the specimen temperature measurement unit 300 is placed inside the heater unit 200 in such a way that the thermocouple sensor 310 faces the opening of the heater unit 200. The sensor arm 320 extends from the lower end of the heater unit 200 to the axial center of the heater unit 200 at an angle and holds the thermocouple sensor 310 at approximately the axial center of the heater unit 200.

The connection cable 450 is separated into two cables in the vicinity of the lower end of the heater unit 200. One of these cables is connected to a heater power terminal (not illustrated) for supplying electric power to the heating elements 220, and the other cable is connected to the thermocouple sensor 310 for sending an output signal from the thermocouple sensor 310.

In the present embodiment, the sensor arm 320 is mechanically secured on the end cover portion 232. Alternatively, the sensor arm 320 may be secured by welding or may be secured on a part different from the end cover portion 232. Further, the end cover portion 232 may be extended, and uses the extended part as the sensor arm 320.

Figure 4:
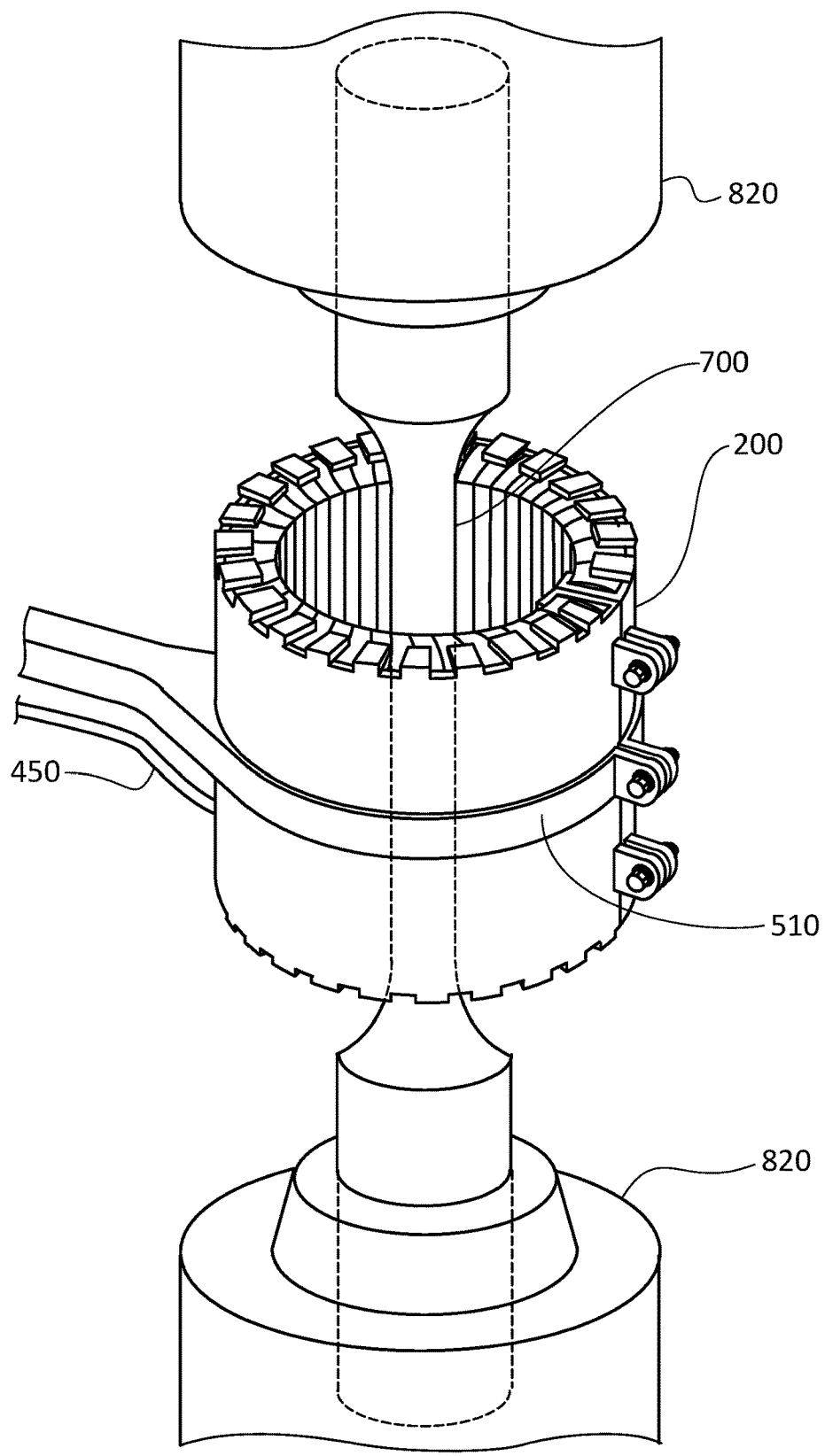
FIG. 4 is a perspective view of the heater unit of the specimen heating apparatus according to the first embodiment placed for heating a test specimen held in a material testing machine.

FIG. 4 is a perspective view of the heater unit 200 of the specimen heating apparatus 100 according to the first embodiment placed for heating the test specimen 700 held in the material testing machine 800. In FIG. 4, the heater unit 200 is held by the heater holding ring 510 in such a way that the heater unit 200 surrounds the test specimen 700 gripped between the specimen grips 820. To set the heater unit 200 in position, first, the opening of the heater unit 200 is widened, and the test specimen 700 is allowed to move into the heater unit 200 through the opening. Subsequently, the heater unit 200 is closed using the bolts and nuts. Then, the heater holding ring 510 is connected to hold the closed heater unit 200 at the set position relative to the test specimen 700 for heating.

Figure 5:
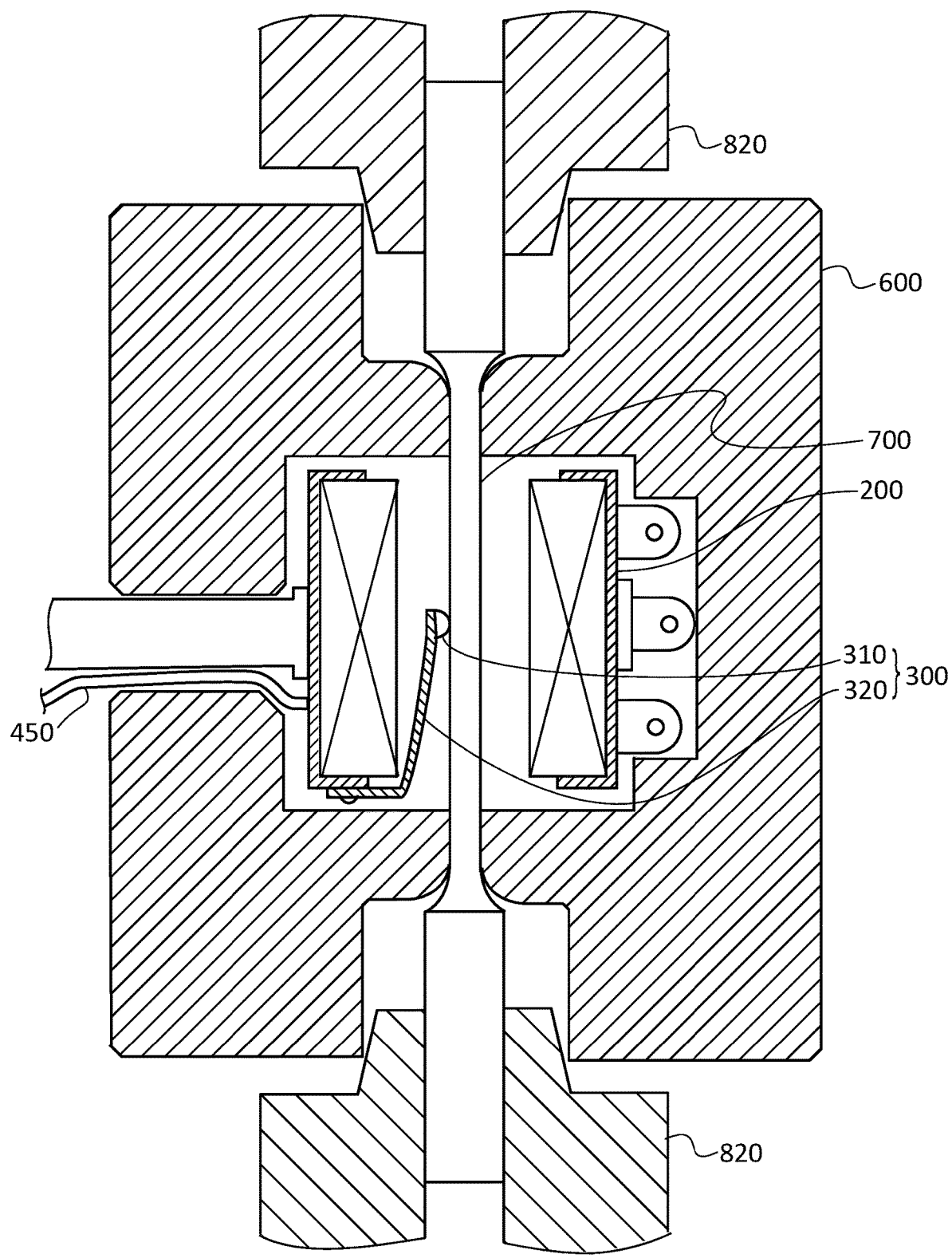
FIG. 5 is a schematic cross-sectional view of the heater unit covered with a thermal insulation unit according to the first embodiment, which is placed for heating a test specimen held in a material testing machine.

FIG. 5 is a schematic cross-sectional view of the heater unit 200 covered with the thermal insulation unit 600 according to the first embodiment, which is placed for heating the test specimen 700 held by the specimen grips 820. When the test specimen 700 is received through the opening of the heater unit 200 and the heater unit 200 is brought to the set position, the thermocouple sensor 310, which is attached to the one end of the sensor arm 320 and placed opposite the opening, comes into contact with and is pressed against the test specimen 700, causing deflection in the sensor arm 320. This ensures that the thermocouple sensor 310 is securely in contact with the test specimen 700 for accurate temperature measurement.

Figure 6:
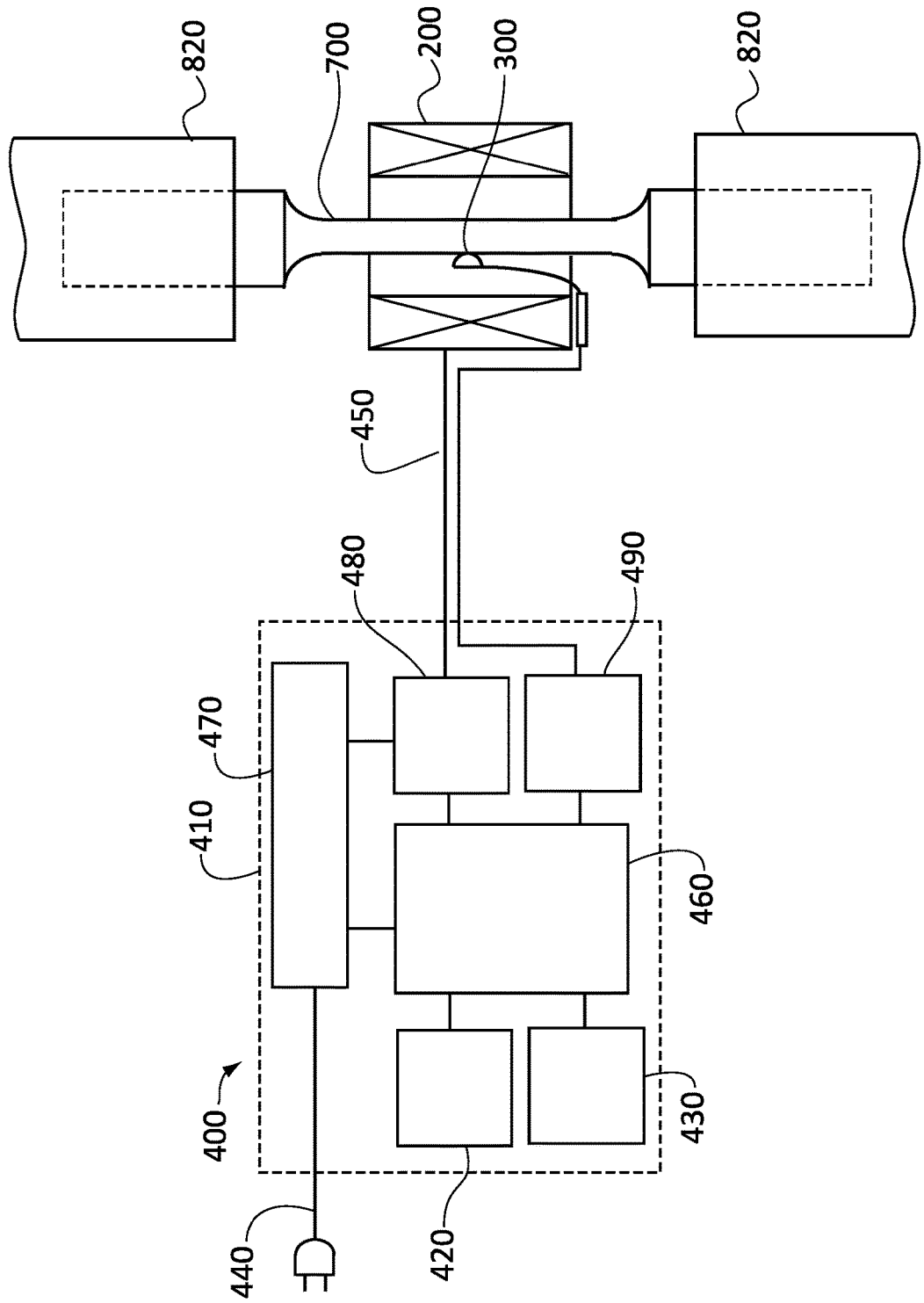
FIG. 6 is a schematic block diagram of a temperature controller of the specimen heating apparatus according to the first embodiment.

FIG. 6 is a schematic block diagram of the temperature controller 400 of the specimen heating apparatus 100 according to the first embodiment. The temperature controller 400 includes, as described above, the controller main unit 410 including the display 420 and the operation buttons 430, the power cable 440, and the connection cable 450. The controller main unit 410 further includes a controller 460, a power supply 470, a relay 480, and a temperature signal processing unit 490.

The display 420, the operation buttons 430, the power supply 470, the relay 480, and the temperature signal processing unit 490 are connected to the controller 460. The relay 480 is, for example, a solid-state relay (SSR) which is an electronic on-off switching device that acts like an electromechanical relay yet has no movable contacts. The relay 480 receives a control signal from the controller 460 and turns on and off the supply of electric power to the heater unit 200 in response to the received control signal.

When a target temperature is set by using the display 420 and the operation buttons 430, the controller 460 sends a control signal to the relay 480 to control turning-on and turning-off of the electric power supply to the heater unit 200 via the connection cable 450. Specifically, the specimen temperature measurement unit 300 abutting the test specimen 700 outputs a signal representing a measured temperature of the test specimen 700 to the temperature signal processing unit 490. The temperature signal processing unit 490 is configured to receive the output signal from the thermocouple sensor 310 and convert the received output signal to a temperature signal, and sends the temperature signal to the controller 460. The controller 460 causes the display 420 to display the measured temperature of the test specimen 700 and maintains the temperature of the test specimen 700 at the target temperature by using feedback control.

Figure 7:
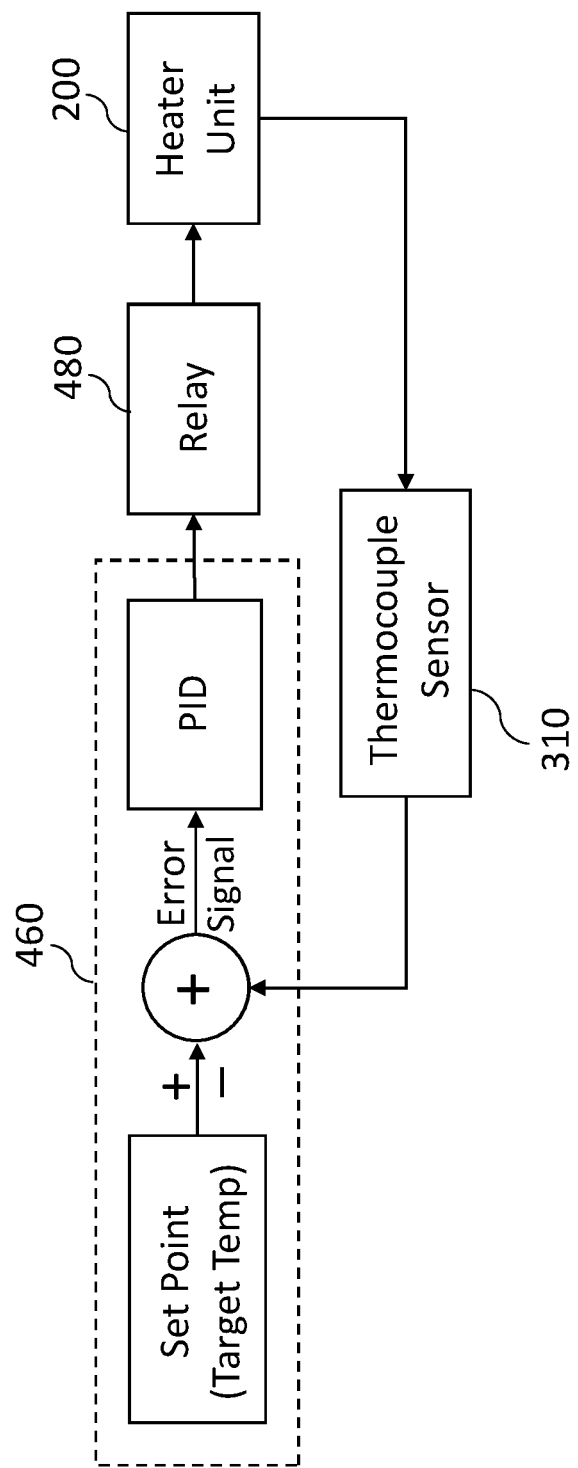
FIG. 7 is a diagram illustrating an exemplary feedback loop for the temperature controller.

FIG. 7 is a diagram illustrating an exemplary feedback loop for the controller 460 of the temperature controller 400. The controller 460 is, for example, a Proportional-Integral-Derivative (PID) controller that uses a control loop feedback mechanism, as illustrated in FIG. 7. The PID controller is used to control the temperature of the heater unit 200 by controlling the electric power supply through the relay 480. The PID controller controls the temperature by applying the correction on the calculated error value e(t) of the difference between the target temperature and the temperature measured with the thermocouple sensor 310.

According to the present embodiment, a specimen heating apparatus 100 having a simpler structure is provided. The specimen heating apparatus 100 is a low-cost and highly efficient heating apparatus capable of heating the test specimen 700 to high temperature. The heater holding unit 500 enables fine adjustment of the position of the heater unit 200 relative to the test specimen 700. Thus, the specimen heating apparatus 100 is easy to install in various material testing machines.

Second Embodiment

Figure 8:
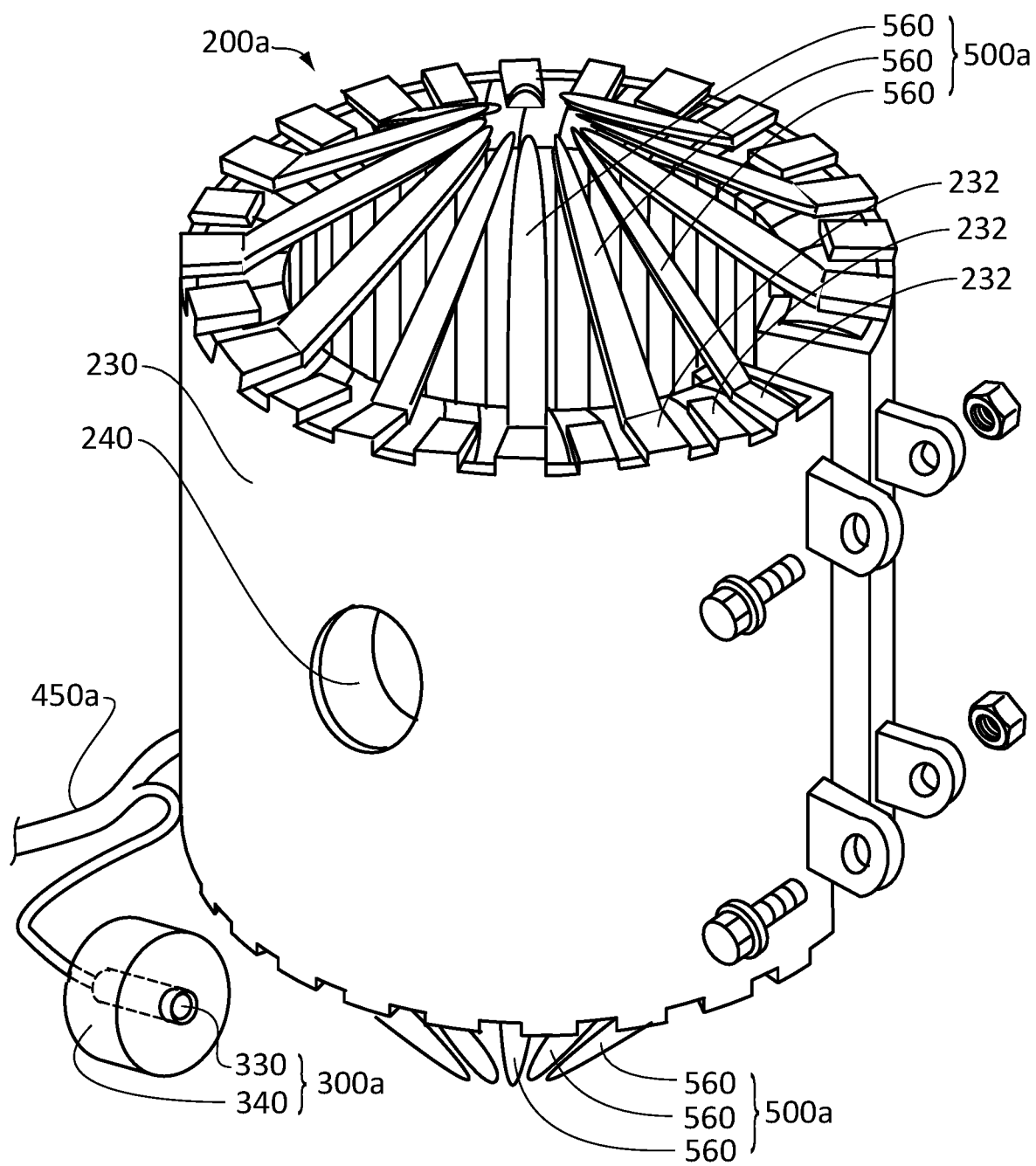
FIG. 8 is a schematic perspective view of a heater unit of a specimen heating apparatus according to a second embodiment.
Figure 9:
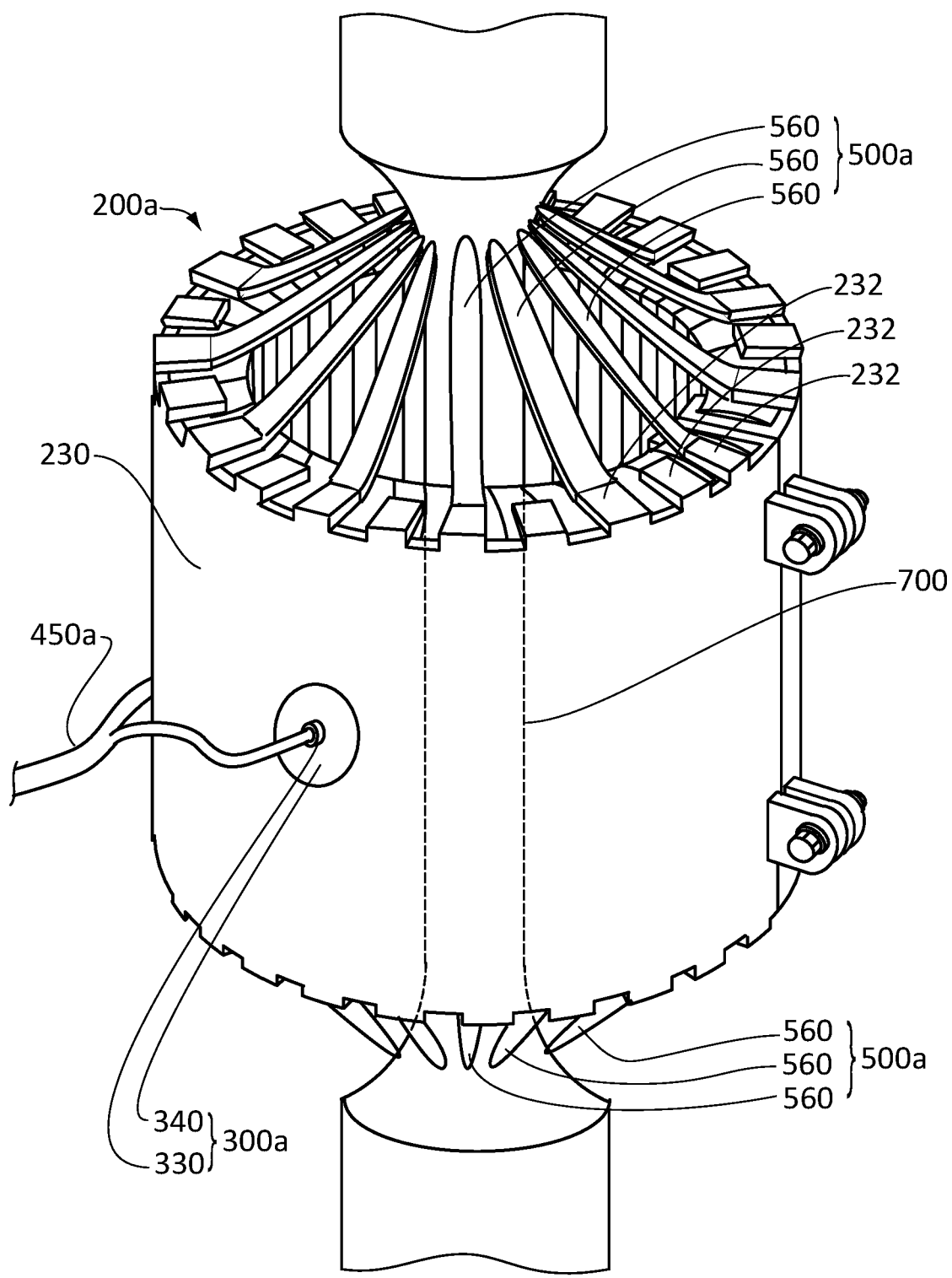
FIG. 9 is a schematic perspective view of the heater unit of the specimen heating apparatus according to the second embodiment, which is placed for heating a test specimen held in a material testing machine.
Figure 10:
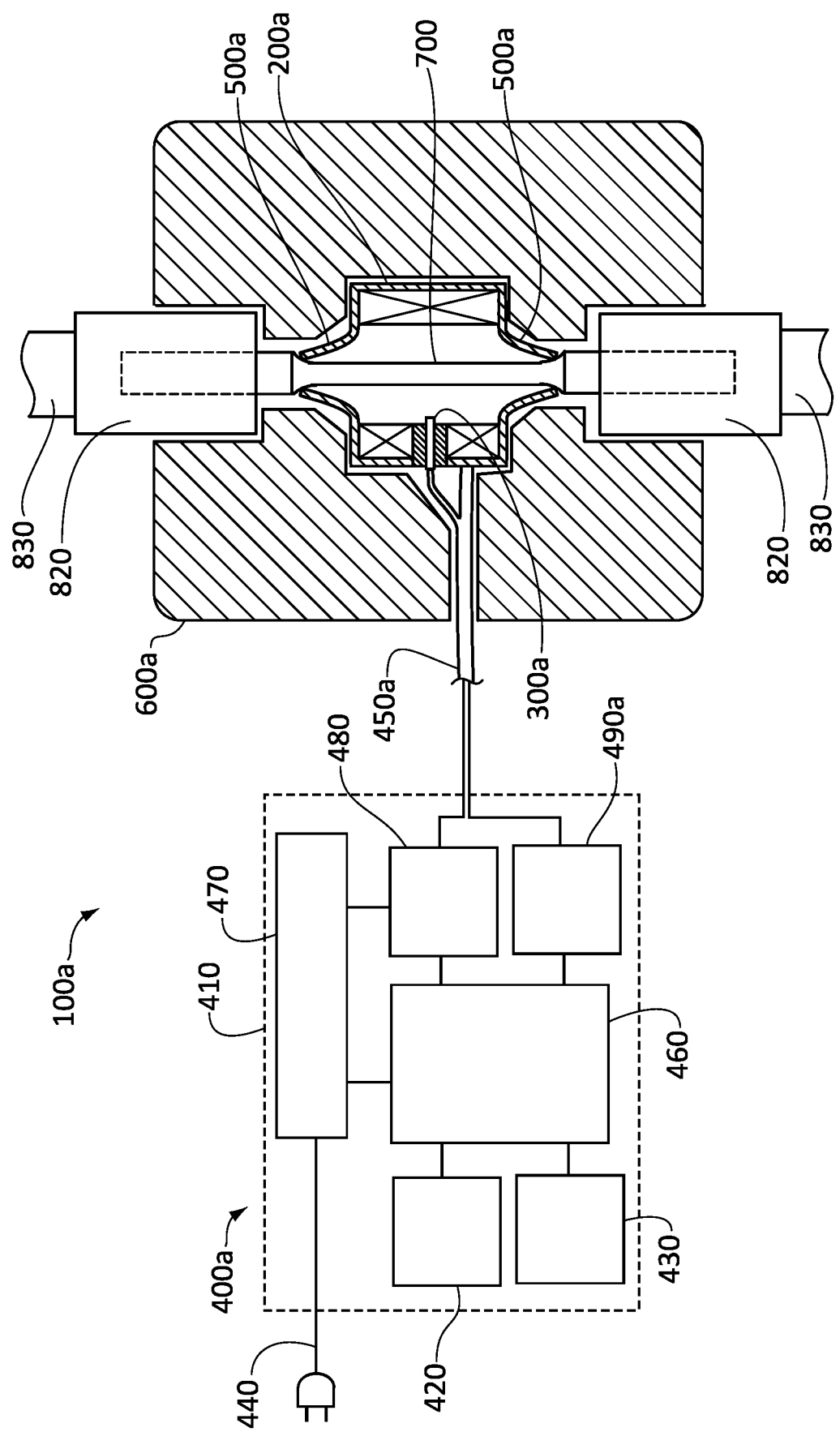
FIG. 10 is a schematic block diagram of the specimen heating apparatus according to the second embodiment.

A specimen heating apparatus according to the second embodiment is described with reference to FIG. 8 to FIG. 10. FIG. 8 is a schematic perspective view of a heater unit 200a of a specimen heating apparatus 100a according to the second embodiment. FIG. 9 is a schematic perspective view of the heater unit 200a that is placed for heating the test specimen 700 held in the material testing machine 800. FIG. 10 is a schematic block diagram of the specimen heating apparatus 100a.

In the present embodiment, the specimen heating apparatus 100a includes the heater unit 200a, a specimen temperature measurement unit 300a, the temperature controller 400a, heater holding units 500a, and the thermal insulation unit 600a, as illustrated in FIG. 10.

The heater unit 200a according to the present embodiment is different from that of the first embodiment in the following two points. First, in the first embodiment, the heater holding unit 500 and the heater unit 200 are made as different components and connected by the heater holding ring 510. Whereas, in the present embodiment, the heater holding unit 500a is incorporated into the heater unit 200a for holding the heater unit 200a in the set position relative to the test specimen 700. The heater holding unit 500a is described in detail below. Second, a temperature sensor attachment hole 240 is formed on the side surface of the heater unit 200a.

The temperature sensor attachment hole 240 is a through-hole for installing a non-contact temperature sensor 330 that measures the surface temperature of the test specimen 700. The non-contact temperature sensor 330 replaces the thermocouple sensor 310 of the first embodiment. The non-contact temperature sensor 330 is described in detail below.

The heater holding unit 500a of the heater unit 200a is now described in detail with reference to FIG. 8 and FIG. 9. The heater holding unit 500a includes a plurality of tongue-like projections 560 continuously extending from all or part of the end cover portions 232 formed at the upper end and the lower end of the metallic housing 230. Each tongue-like projection 560 has an equal length and projects toward the axial center of the heater unit 200a at an angle. The tongue-like projections 560 are made of the same material as the end cover portions 232 and the metallic housing 230, which is made of a metal plate such as a stainless steel plate or the like.

The overall length of the heater unit 200a including two heater holding units 500a formed at the upper end and the lower end of the heater unit 200 is approximately equal to the gauge length of the test specimen 700 to be tested. In other words, an axial distance from top part of the plurality of tongue-like projections 560 formed on the upper end of the heater unit 200a to top part of the plurality of tongue-like projections 560 formed on the lower end of the heater unit 200a is approximately equal to the length of the gauge section of the test specimen 700 to be tested. This enables the plurality of tongue-like projections 560 to come into contact with the test specimen 700 at locations between the gauge section and the shoulders and enables the heater unit 200a including two heater holding units 500a to fit between the shoulders of the test specimen 700.

When the heater unit 200a is set in the material testing machine 800 for heating the test specimen 700, the plurality of tongue-like projections 560 enables the heater unit 200a to be self-aligned with the test specimen 700 and held securely in the set position relative to the test specimen 700. This is because all of the tongue-like projections 560 project toward the axial center of the heater unit 200a, thereby the heater unit 200a is coaxially self-aligned with the test specimen 700. Further, because the plurality of tongue-like projections 560 is flexible and generate holding force as a whole when the plurality of tongue-like projections 560 is pressed against the test specimen 700 and the top part of each tongue-like projection 560 bows outward. This prevents the heater unit 200a from sliding up or down.

The tongue-like projection 560 may alternatively be formed as a separate member and then welded or mechanically secured by riveting on the end cover portion 232. The tongue-like projection 560 may also be secured to a location other than the end cover portion 232. According to the present embodiment, the heater holding unit 500a can be significantly simplified compared with that of the first embodiment illustrated in FIG. 2. The shape of a top end portion of the tongue-like projection 560 may be changed depending on the cross-sectional shape of the test specimen 700 for better fitting. This enables the specimen heating apparatus 100a to be compatible with different types of test specimens.

The non-contact temperature sensor 330 is now described in detail with reference to FIG. 8 and FIG. 9. In the present embodiment, the specimen temperature measurement unit 300a includes the non-contact temperature sensor 330 and a padding 340 covering the non-contact temperature sensor 330. The non-contact temperature sensor 330 is, for example, a surface temperature sensor such as an infrared temperature sensor. The padding 340 is made of a high-temperature thermal insulation material. The overall diameter of the non-contact temperature sensor 330 covered by the padding 340 is approximately equal to the diameter of the temperature sensor attachment hole 240.

When the non-contact temperature sensor 330 is installed in the heater unit 200a, the non-contact temperature sensor 330 measures infrared rays radiated from the surface of the test specimen 700. The temperature sensor attachment hole 240 is arranged in such a way that the non-contact temperature sensor 330 covered with the padding 340 points directly to the test specimen 700 when the heater unit 200a is brought to the set position for heating.

As illustrated in FIG. 10, the temperature controller 400a includes the display 420, the operation buttons 430, the power cable 440, and a connection cable 450a, the controller 460, the power supply 470, the relay 480, and a temperature signal processing unit 490a. The connection cable 450a is used to supply electric power to the heater unit 200a for heating the test specimen 700 and to send an output signal from the non-contact temperature sensor 330 to the temperature signal processing unit 490a. The temperature signal processing unit 490a is configured to receive the output signal from the non-contact temperature sensor 330 and convert the received output signal into a temperature signal.

The thermal insulation unit 600a is the same as the thermal insulation unit 600 of the first embodiment except that the space formed inside the thermal insulation unit 600a is modified so as to accommodate the plurality of tongue-like projections 560 formed at the upper end and the lower end of the heater unit 200a.

According to the present embodiment, the tongue-like projections 560 enables the heater unit 200a to stay in position and to be aligned with the test specimen 700 gripped between the specimen grips 820 of the material testing machine 800, and the non-contact temperature sensor 330 installed on the side of the heater unit 200 enables to measure the real-time surface temperature of the test specimen 700 without the need for any physical contact.

Third Embodiment

Figure 11:
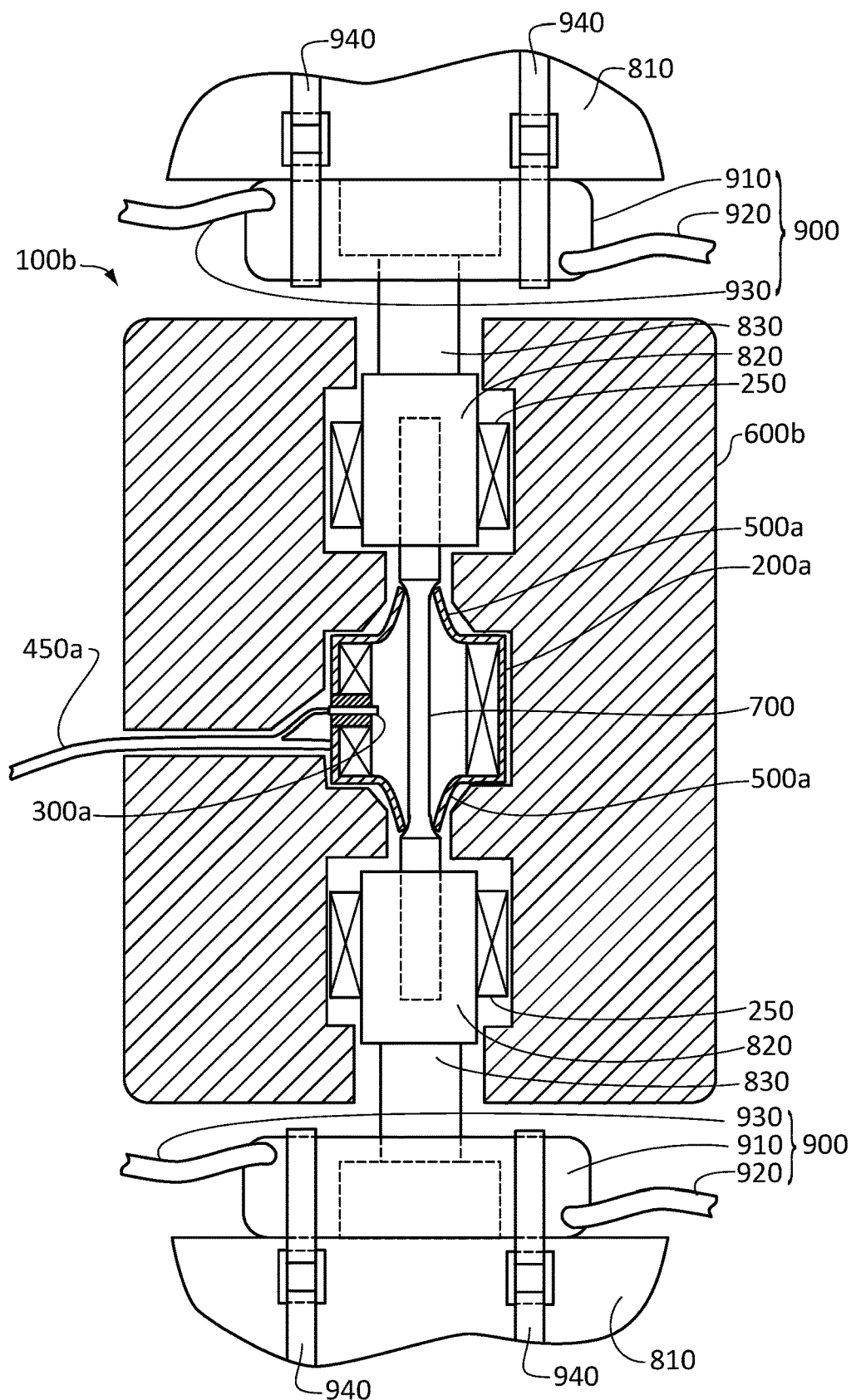
FIG. 11 is a schematic cross-sectional view of a specimen heating apparatus according to a third embodiment, which is placed for heating a test specimen held in a material testing machine.

FIG. 11 is a schematic cross-sectional view of a specimen heating apparatus 100b according to the third embodiment, which is placed for heating the test specimen 700 held between the specimen grips 820 of the material testing machine 800. The specimen heating apparatus 100b includes the heater unit 200a, the specimen temperature measurement unit 300a, the temperature controller (not illustrated), the heater holding unit 500a, and a thermal insulation unit 600b. The heater unit 200a, the specimen temperature measurement unit 300a, the temperature controller, and the heater holding unit 500a are the same as those in the second embodiment. The specimen heating apparatus 100b of the present embodiment further includes a pair of detachable auxiliary heaters 250 and a pair of detachable cooling units 900. The thermal insulation unit 600b is modified from the thermal insulation unit 600a of the second embodiment so as to accommodate the additional auxiliary heaters 250.

The auxiliary heater 250 is a band heater attached to each specimen grip 820 for heating the test specimen 700 from its shoulder, which is gripped by the specimen grip 820. The auxiliary heaters 250 are powered and controlled by the temperature controller, as in the heater unit 200a. Heating the specimen grips 820 with the auxiliary heaters 250 shortens time to reach the target temperature at the test specimen 700 and assists in maintaining the target temperature of the test specimen 700.

In this case, however, part of the heat generated by the auxiliary heater 250 may escape through the connecting rod 830 to the main frame 810 of the material testing machine 800. In the present embodiment, in order to prevent or reduce such heat loss, the detachable cooling unit 900 is installed at the base of each connecting rod 830. The cooling unit 900 cools the connecting rod 830 to reduce the heat transfer through the connecting rod 830 and reduces a temperature rise in the main frame 810 of the material testing machine 800. The cooling unit 900 includes a cooler 910, a feed water tube 920, a drain tube 930, attachment belts 940, and a feed water supply (not illustrated). Cold water is supplied to the cooler 910 through the feed water tube 920, and hot water heated at the base of the connecting rod 830 is drained from the drain tube 930. The cooler 910 is secured to the main frame 810 of the material testing machine 800 by the attachment belts 940. Alternatively, the cooler 910 may be secured to another part of the material testing machine 800, through which major part of the heat generated by the auxiliary heater 250 is transferred.

The feed water supply of the cooling unit 900 may be communicably connected to the temperature controller 400*a* using a wired or wireless connection, and the temperature controller 400*a* may control the output of the feed water supply in response to the measured temperature of the test specimen 700. For example, to facilitate cooling down of the test specimen 700 after testing, the temperature controller 400*a* may increase the feed water output after the heating of the test specimen 700 stops at the end of a test and maintains the increased feed water output until the measured temperature of the test specimen 700 falls below a predetermined temperature. Such temperature control by the temperature controller 400*a* after the end of a test may also be performed together with the locking control of the locks 630. This further improves safety of the operation at high temperature environment.

According to the present embodiment, the specimen heating apparatus 100*b* can heat up the test specimen 700 faster without damaging the material testing machine 800.

A number of embodiments have been described. Nevertheless, it will be understood that various modifications may be made without departing from the spirit and scope of this disclosure. For example, in the foregoing embodiments, the specimen heating apparatus is described for use in the material testing machine performing tensile testing. However, the specimen heating apparatuses according to the present disclosure may also be used in other mechanical tests.

The invention claimed is:

1. A specimen heating apparatus for a material testing machine, comprising:
a heater unit configured to heat a test specimen held in the material testing machine for mechanical strength testing wherein the heater unit comprises a plurality of ceramic insulators, a plurality of heating elements, and a metallic housing, wherein the heater unit is cylindrical and configured to circumferentially enclose the test specimen;
a heater holding unit configured to hold the heater unit in a set position relative to the test specimen for heating the test specimen held in the material testing machine wherein the heater holding unit includes a top plurality of tongue-like projections formed on an upper end of the heater unit, the top plurality of tongue-like projections each extending upwards toward an axial center of the heater unit and a bottom plurality of tongue-like projections formed on a lower end of the heater unit, the bottom plurality of tongue-like projections each extending downwards toward an axial center of the heater unit;
a specimen temperature measurement unit attached to the heater unit and configured to measure temperature of the test specimen when the heater unit is in the set position wherein the specimen temperature measurement unit comprises a thermocouple sensor and a sensor arm, the sensor arm being attached to the heater unit at one end and to the thermocouple sensor at another end;
a temperature controller configured to control heating of the heater unit in response to a temperature measured by the specimen temperature measurement unit; and
a thermal insulation unit configured to cover the heater unit.

2. The specimen heating apparatus of claim 1,
wherein each ceramic insulator extends lengthways and has an equal length,
wherein each heating element penetrates through inside the plurality of the ceramic insulators,
wherein the metallic housing is configured to hold the plurality of ceramic insulators so that the plurality of ceramic insulators is swingable and forms an opening that is allowed to be opened and closed for receiving the test specimen.

3. The specimen heating apparatus of claim 2, wherein the heater unit further includes a heat insulator arranged between the plurality of ceramic insulators and the metallic housing.

4. The specimen heating apparatus of claim 1, wherein the sensor arm is made of a flexible material and arranged inside the heater unit opposite the opening in such a way that, when the heater unit is brought to the set position, the thermocouple sensor attached to the sensor arm comes in contact with the test specimen and the test specimen deflects the sensor arm upon contact.

5. The specimen heating apparatus of claim 1, wherein the specimen temperature measurement unit includes a non-contact temperature sensor installed in a through-hole formed on a side surface of the heater unit.

6. The specimen heating apparatus of claim 5, wherein the specimen temperature measurement unit further includes a heat insulating padding covering the non-contact temperature sensor, and wherein the non-contact temperature sensor covered with the heat insulating padding is inserted into the through-hole formed on the side surface of the heater unit.

7. The specimen heating apparatus of claim 6, wherein the through-hole formed on the side surface of the heater unit is arranged in such a way that the non-contact temperature sensor, which is covered with the heat insulating padding and inserted into the through-hole, points the test specimen when the heater unit is in the set position.

8. The specimen heating apparatus of claim 1, wherein the heater holding unit includes a heater holding ring for holding the heater unit, a heater holding arm connected to the heater holding ring and configured to be extendable in a horizontal direction, a vertical stand configured to hold the heater holding arm in such a way that a holding location of the heater holding arm is movable in a vertical direction, and a support base on which the vertical stand is secured.

9. The specimen heating apparatus of claim 1, wherein an axial distance from a top part of the top plurality of tongue-like projections to a top part of the bottom plurality of tongue-like projections is equal to length of a gauge section of the test specimen.

10. The specimen heating apparatus of claim 1, wherein when the heater unit is in the set position, the top plurality of tongue-like projections comes into contact with the test specimen at locations between a gauge section and shoulders of the test specimen.

* * * * *